United States Patent Office 2,910,501
Patented Oct. 27, 1959

2,910,501

THIOPHOSPHORIC ACID ESTERS AND PROCESS FOR THEIR MANUFACTURE

August Dörken, Wuppertal-Sonnborn, and Gerhard Schrader, Wuppertal-Cronenberg, Germany, assignors to Farbenfabriken Bayer Aktiengesellschaft, Leverkusen, Germany, a corporation of Germany No Drawing. Application December 24, 1957
Serial No. 704,870

Claims priority, application Germany January 5, 1957

6 Claims. (Cl. 260—461)

The present invention relates to and has as its object thiophosphoric acid esters of the following formula

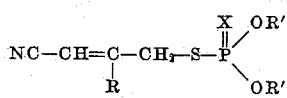

in which R stands for hydrogen or a lower alkyl radical up to 4 carbon atoms, X stands for oxygen or sulfur, and R′ stands for a lower alkyl radical up to 4 carbon atoms.

These cyano olefinic thio- or dithiophosphoric acid esters according to the present invention are obtainable by reacting the corresponding 1-cyano-allyl-halides with dialkyl thiol- or dialkyl thiono-thiolphosphoric acids. This reaction may be shown by the following equation:

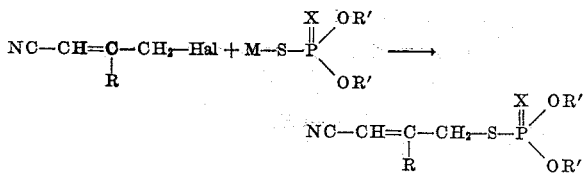

In this equation R, R′ and X have the same significance as shown above, Hal stands for preferably chlorine or bromine, and M stands for a salt-forming radical especially alkali metal or for the ammonium radical.

Instead of using salts of thiol- or thionothiolphosphoric acids the free acids also may be used, if the reaction is carried out in the presence of suitable acid-binding agents, such as alkali metal carbonates, hydroxides, alcoholates, organic amines, especially organic tertiary amines, and the like. The reaction generally has to be carried out in the presence of suitable inert solvents such as alcohols, lower aliphatic ketones, such as acetone or methyl ethyl ketone, benzene, toluene, and the like. The temperature at which the reaction should be performed may vary within wide limits, but should preferably be between about 0° C. and slightly elevated temperatures say up to about 70° C.

The new compounds of the present invention very effectively kill insects like flies, mites, aphids, etc. They distinguish themselves especially by a good contact-insecticidal activity and at the same time by an activity on eating insects such as caterpillars. The inventive compounds partially exhibit also an outstanding ovicidal action. Most surprisingly they are of remarkable low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers) alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the compound of the following formula

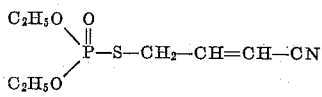

has been tested against spider mites. Aqueous dilutions of this compound have been prepared by admixing this compound with the same amount of an auxiliary solvent (acetone). A commercial emulsifier (benzyl hydroxy diphenyl polyglycol ether) is added in an amount of 20% referred to active ingredient. This premixture then is diluted with water to a concentration of 0.01%. The tests have been carried out as follows: *Tetranychus altaeae* V. Hanst (two spotted spider) infested *Phaseolus vulgaris* plants have been sprayed to the run off by the aqueous emulsions as prepared above. 100% killing occurred after 24 hours.

The following examples are given by way of illustration only without, however, limiting the present invention thereto:

*Example 1*

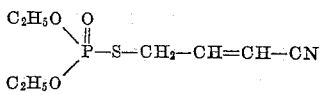

Into a solution of 38 grams of diethyl thiolphosphoric acid ammonium salt (0.2 mol) in 140 millilitres of anhydrous methyl ethyl ketone are introduced dropwise at 45–50° C. within 6 minutes 21 grams of γ-chloro crotonic acid nitrile, and the reaction mixture is kept with stirring at 50° C. for a further 16 hours. The mixture is then cooled and the ammonium chloride thus formed is filtered off. The filtrate is free from the solvent by distillation. The residue is dissolved in 100 millilitres of ether and the solution is washed twice with 40 millilitre portions of water. After separation of the layers the ethereal solution is dried over sodium sulfate, treated with activated carbon, and the ether is distilled off. The remaining crude product is distilled under high vacuum. 39 grams of the new ester are obtained as clear yellowish oil of B.P. 94° C./0.01 mm. Hg. The new ester is water-insoluble. Yield 82% of the theoretical.

Calc. for mol 235.2: P=13.2%, S=13.6%, N=5.95%. Found: P=13.2%, S=14.1%, N=5.8%. Toxicity on rats per os LD$_{50}$ 25 mg./kg.

Aphids are completely killed with emulsions containing 0.001% solutions. Eggs of the red spider are completely killed with aqueous suspensions containing 0.01% solutions. 0.1% suspensions of the new ester have a 100% systemic action. 0.01% emulsions kill spider mites completely.

*Example 2*

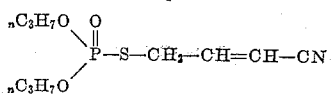

44 grams of di-n-propylthiolphosphoric acid ammonium salt are dissolved in 150 millilitres of anhydrous methyl ethyl ketone. Into this solution are introduced dropwise at 50° C. 21 grams of γ-chlorocrotonic acid nitrile and the mixture is stirred for a further 17 hours at 50° C. The mixture is cooled and the ammonium salt thus formed is filtered off. The solvent is removed from the filtrate by distillation. The residue is dissolved with 100 millilitres of ether, and washed twice with 30 millilitre portions of water. The ethereal layer is dried with sodium sulfate and purified with activated carbon. The crude product remaining after distillation of the ether is distilled under high vacuum. 40.4 grams of the new ester are obtained as a clear pale brown water-insoluble oil of B.P. 116–118° C./0.01 mm. Hg. Yield 76.7% of the theoretical.

Calc. for mol 263.3: P=11.77%, S=12.2%, N=5.3%. Found: P=11.85%, S=12.59%, N=5.2%. Toxicity on rats per os $LD_{50}$ 25 mg./kg.

Example 3

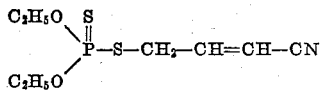

To a solution of 51 grams of diethyl dithiophosphoric acid ammonium salt (¼ mol) in 140 millilitres of anhydrous methyl ethyl ketone are added dropwise with stirring and cooling at 50° C. within 6 minutes 26.3 grams of γ-chlorocrotonic acid nitrile, and the mixture is kept at 50° C. for another 16 hours. The mixture is then cooled, the ammonium chloride thus formed is removed by filtration, and the solvent is distilled from the filtrate under vacuum. The residue is dissolved in 100 millilitres of ether, the solution is washed with water, and the separated ethereal solution is dried over sodium sulfate. For purification, the solution is treated with activated carbon and fractionated. 56.8 grams of the new ester are obtained as a clear yellow oil of B.P. 108–109° C./0.01 mm. Hg. Yield 90.3% of the theoretical.

Calc. for mol 251.3: P=12.33%, S=25.53%, N=5.58%. Found: P=12.28%, S=25.95%, N=5.56%. Toxicity on rats per os $LD_{50}$ 50 mg./kg.

Flies (*Musca domestica*) are killed completely with 0.0001% aqueous emulsions after 24 hours. Tests have been carried out by the screening method. Caterpillars are killed completely with 0.1% aqueous solutions.

Example 4

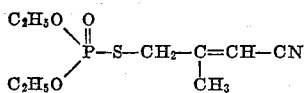

39 grams of the ammonium salt of O.O-diethyl thiolphosphoric acid are dissolved in 50 ml. of anhydrous ethanol. At 60° C. there are added while stirring 24 grams of 1-cyano 2-methyl-allylchloride, B.P. 19 mm./89° C. After stirring for 1 further hour at 70° C. the reaction mixture is diluted with 200 millilitres of benzene, and the benzenic layer is washed with 100 millilitres of water. After separating the layers the organic layer is dried over anhydrous sodium sulfate. After evaporating the benzene the above new ester is distilled in vacuum, where it boils at 0.01 mm. Hg. at 108° C. Yield: 44% of the theoretical. The toxicity on rats per os is 15 mg./kg. $LD_{95}$.

Spider mites (*Tetranichus althaeae*) are killed completely with aqueous emulsions containing 0.01% active ingredients. Caterpillars (diamond back moth) are killed with emulsions containing 0.1% active ingredients.

Example 5

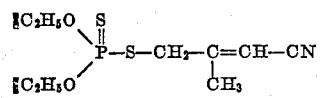

42 grams of the ammonium salt of O.O-diethyl thionothiolphosphoric acid are dissolved in 76 millilitres of methyl ethyl ketone. After adding 4 millilitres of water there are dropped into this mixture at 60° C. while stirring 24 grams of 1-cyano-2-methyl allylchloride. The reaction mixture is kept for 1 further hour at 70° C. and then it is diluted with 200 millilitres of benzene. After washing this mixture twice with 100 millilitres of water the benzenic layer is dried over sodium sulfate. The benzene is distilled off and the residue is distilled at 0.01 mm. at 112° C. There are obtained 25 grams of the new ester as a colorless water insoluble oil. The toxicity on rats per os has been determined to be 50 mg./kg. $LD_{95}$.

We claim:

1. Thiophosphoric acid esters of the general formula

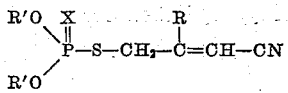

wherein R' stands for a lower alkyl radical having 1 to 4 carbon atoms, X stands for a member selected from the group consisting of oxygen and sulfur, and R stands for a member selected from the group consisting of hydrogen and lower alkyl radicals up to 4 carbon atoms.

2. A thiophosphoric acid ester of the formula:

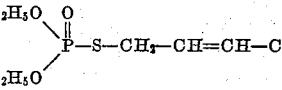

3. A thiophosphoric acid ester of the formula:

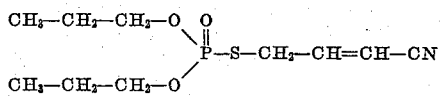

4. A thiophosphoric acid ester of the formula:

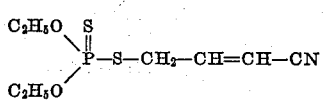

5. A thiophosphoric acid ester of the formula:

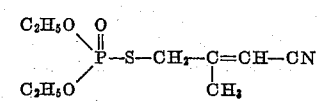

6. A thiophosphoric acid ester of the formula:

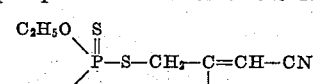

References Cited in the file of this patent

UNITED STATES PATENTS

| | | |
|---|---|---|
| 2,589,326 | Oberright | Mar. 18, 1952 |
| 2,815,312 | Schuler | Dec. 3, 1957 |

FOREIGN PATENTS

| | | |
|---|---|---|
| 947,368 | Germany | Aug. 16, 1956 |
| 78,252 | Netherlands | June 15, 1955 |

OTHER REFERENCES

Pudovik: "Doklady Akad. Nauk S.S.S.R.", 105, pp. 735–7 (1955), (in Russian).